Figure 1:
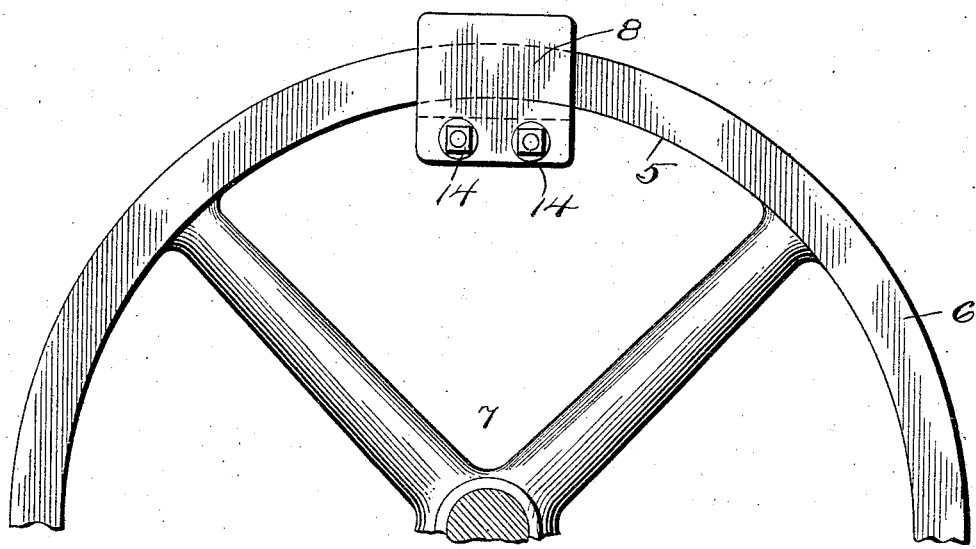

No. 855,420. PATENTED MAY 28, 1907.
J. J. SHERIDAN.
BELT HOLDING DEVICE.
APPLICATION FILED FEB. 26, 1906.

Witnesses
Samuel T. Payne
R. H. Butler

Inventor
John J. Sheridan
by H. C. Everett Co.
Attorneys.

THE NORRIS PETERS CO., WASHINGTON, D. C.

UNITED STATES PATENT OFFICE.

JOHN J. SHERIDAN, OF CASSANDRA, PENNSYLVANIA, ASSIGNOR OF ONE-HALF TO BERNARD HENDLER, OF CASSANDRA, PENNSYLVANIA.

BELT-HOLDING DEVICE.

No. 855,420.  Specification of Letters Patent.  Patented May 28, 1907.

Application filed February 26, 1906. Serial No. 302,951.

*To all whom it may concern:*

Be it known that I, JOHN J. SHERIDAN, a citizen of the United States of America, residing at Cassandra, in the county of Cambria and State of Pennsylvania, have invented certain new and useful Improvements in Belt-Holding Devices, of which the following is a specification, reference being had therein to the accompanying drawing.

This invention relates to certain new and useful improvements in belt holding devices, and the invention relates more particularly to a device adapted to be attached to a belt or pulley wheel, for retaining the belt upon the periphery of the wheel or pulley, when in operation.

The primary object of this invention is to provide a belt holding device which can be easily and quickly clamped to the rim of a wheel, whereby as the belt passes around the periphery of the wheel, it will be impossible for the same to become disengaged therefrom.

My invention aims to provide a belt holding device which is applicable to various kinds of wheels or pulleys, and to this end, I have constructed a device which will be extremely simple, strong and durable, comparatively inexpensive to manufacture, and highly efficient for the purposes for which it is used.

With the above and other objects in view, which will more readily appear as the nature of the invention is better understood, the same consists in the novel construction, combination and arrangement of parts to be hereinafter more fully described and claimed, and referring to the drawing accompanying this application, like numerals of reference designate corresponding parts throughout the several views, in which:—

Figure 2:
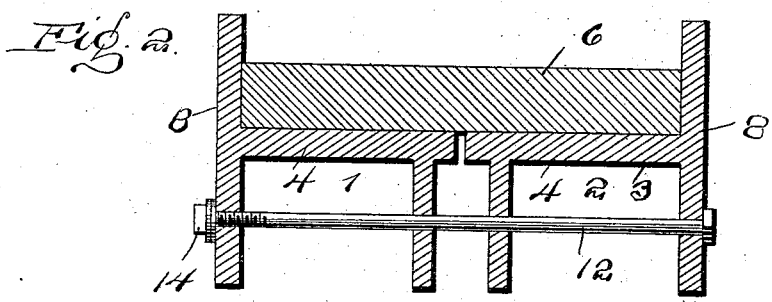
Figure 3:
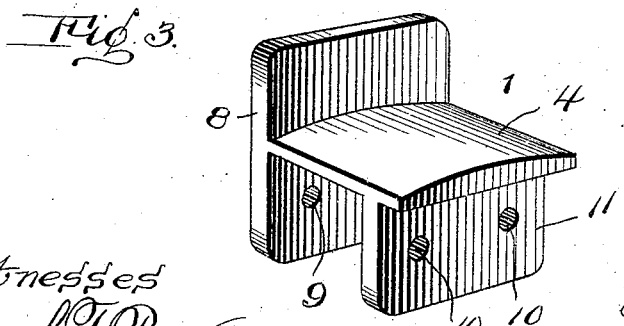

Figure 1 is a fragmentary side elevation of a wheel or pulley equipped with my improved belt holding device, Fig. 2 is a cross sectional view of the rim of a wheel equipped with my improved device, and Fig. 3 is a perspective view of one of the members of the belt holding device.

The device comprises two similar members designated 1 and 2 respectively in Fig. 2 of the drawings, the members being however, identical in construction. Each of these members comprises a horizontal plate 3 provided with a curved upper side or face 4, so as to adapt the same to the curved inner face 5 of the rim 6 of a wheel or pulley 7. At one end of the horizontal plate 3 is an end plate 8 equal in width to the width of the plate 3, and which extends substantially the same distance on each side of the said plate 3. Projecting from the underneath face of said plate 3 near the other end thereof is a flange 11 also of the same width as the plate 3 and the end plate 8. This flange 11 is provided with bolt openings 10, and the portion of the plate 8 which projects below the plate 3 is provided with bolt openings 9, alining with the openings 10 in the plate 11.

The members are placed in engagement with the edges of the rim 6 of the wheel or pulley 7, the flanges 3 engaging the edges of the rim, and extending a slight distance above the periphery of said rim, as clearly illustrated in Fig. 2 of the drawings. The members are clamped in engagement with the rim of the wheel or pulley 7 by transversely disposed bolts 12, 12, which are adapted to pass through the apertures 9, 9 and 10, 10 of each member and be secured in engagement with said members by nuts 14.

The diametrically opposed flanges extending above the rim 6 of the wheel or pulley 7 are adapted to form the guide way for a belt (not shown) passing over said wheel or pulley, and prevent the belt from becoming disengaged from the wheel or pulley.

I preferably construct the members of my improved belt holding device, of strong and durable metal, although wood may be readily used in some instances, the selection of material employed being arbitrary.

What I claim and desire to secure by Letters Patent, is:—

A belt holding device comprising two similar members, each member embodying a horizontal plate provided with a curved upper face, an end plate extending beyond both the upper and lower face of said horizontal plate, a flange projecting from the lower face of said horizontal plate near the opposite end thereof, said flange and the portion of said end plate which projects below the horizontal plate being provided with bolt openings, and bolts passed through the openings in said parts of the two members for binding the members to a wheel, substantially as described.

In testimony whereof I affix my signature in the presence of two witnesses.

JOHN J. SHERIDAN.

Witnesses:
 L. KLAFTER,
 B. HENDLER.